Patented Oct. 12, 1954

2,691,678

UNITED STATES PATENT OFFICE 2,691,678

2,2-DIPHENYL-4-DI-LOWER-ALKYLAMINO-ALKANALS

Aubrey A. Larsen, Nassau, N. Y., assignor to Sterling Drug Inc., New York, N. Y., a corporation of Delaware No Drawing. Application May 17, 1952,
Serial No. 288,537

14 Claims. (Cl. 260—570)

This invention relates to certain new and useful basic aldehydes and to a process for preparing them. The new basic aldehydes are 2,2-diphenyl-4-di-lower-alkylamino-alkanals having the formula

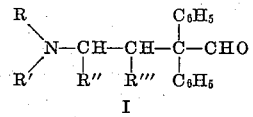

I wherein R and R' are lower-alkyl groups, one of R'' and R''' is a methyl group and the other of R'' and R''' is hydrogen; and to water-soluble, non-toxic salts thereof. These compounds are useful as pharmacodynamic agents, and in particular possess analgesic activity.

These new and useful basic aldehydes are prepared by reducing the corresponding basic nitrile having the formula

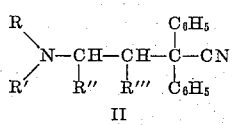

II wherein the generic terms have the same meaning as given hereinabove, with lithium aluminum hydride. This involves essentially replacement of the cyano (CN) group by an aldehyde (CHO) group. The reaction is conveniently carried out by causing the lithium aluminum hydride to react with the basic nitrile (II) while the latter is dissolved in an inert organic solvent under substantially anhydrous conditions.

The inert organic solvent is one which takes no part in the chemical reaction, and one which will not react in any way with the starting nitrile (II), the final product (I) or the reducing agent, the lithium aluminum hydride. The solvent should be relatively volatile, preferably boiling below about 150° C., to facilitate its removal. Organic solvents meeting these requirements include lower aliphatic ethers, in particular diethyl ether, and hydrocarbon solvents, for example, benzene, toluene, xylene, petroleum ether, and the like.

The lithium aluminum hydride reacts readily with the nitrile (II) at room temperature or below, although heating may be used if desired. Theoretically one molecule of lithium aluminum hydride will reduce four molecules of nitrile. The reaction may be represented as follows, including the subsequent hydrolysis of the intermediate complex (III):

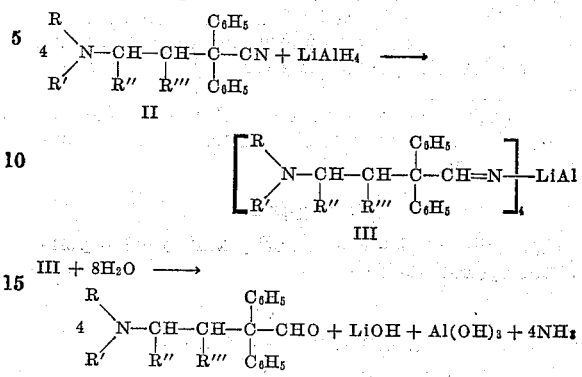

In practice, it is preferred to use a slight excess of lithium aluminum hydride, about one-third to one-half of a mole with respect to the basic nitrile, to insure more complete reaction.

After the reaction of the lithium aluminum hydride with the nitrile (II) is complete, water is added to destroy excess reducing agent and to hydrolyze the intermediate complex (III). The basic aldehyde (I) will be found dissolved in the inert organic solvent, and it can be isolated by conventional methods, either as the free base or as an acid-addition salt, conveniently the hydrochloride. A preferred method of isolation and purification is set forth in the examples below. The presence of an aldehyde functional group was proved by absorption of one mole of hydrogen upon catalytic reduction to give the corresponding alcohol.

In the new compounds of Formula I, the grouping RR'N— represents a di-lower-alkylamino radical including dimethylamino, ethylmethylamino, diethylamino, dipropylamino, dibutylamino and the like. By a lower-alkyl group is meant one having not more than six carbon atoms.

The basic aldehydes are preferably used in the form of water-soluble acid-addition salts or quaternary ammonium derivatives. The acids which can be used to prepare the salts are those which produce, when combined with the basic aldehydes, salts whose anions are relatively innocuous to the animal organism in therapeutic doses of the salts, so that the beneficial physiological properties inherent in the basic aldehydes are not vitiated by any side effects ascribable to the anions. Appropriate acid-addition salts are those derived from mineral acids such as hydrochloric acid, hydrobromic acid, hydriodic acid and sulfuric acid, and organic acids such as acetic acid, citric acid and tartaric acid. The quaternary ammonium salts are prepared by mixing the free basic aldehyde with a lower-alkyl or aralkyl ester of a strong inorganic acid or organic sulfonic acid, preferably in an inert organic solvent such as benzene or ether, with or without gentle heating. The salt either crystallizes immediately or can be obtained by concentration of the solvent. Exemplary alkyl or aralkyl esters of inorganic acids or organic sulfonic acids which can be used include methyl chloride, methyl bromide, methyl iodide, ethyl bromide, propyl chloride, benzyl chloride, benzyl bromide, methyl sulfate, methyl benzenesulfonate and methyl p-toluenesulfonate.

The new basic aldehydes contain an asymmetric carbon atom in the side chain at the position bearing the methyl group (R'' or R'''), and thus can exist as optically active enantiomorphs. The latter are conveniently prepared by lithium aluminum hydride reduction of the corresponding optically active basic nitriles. The pharmacological activity usually resides almost exclusively in one optical isomer, and therefore the correct enantimorph will possess higher activity than the racemic form.

The following examples will illustrate the invention more fully but should not be construed as limitative.

Example 1

2,2 - diphenyl - 4 - dimethylamino - 1 - pentanal hydrochloride

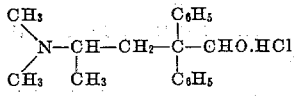

Lithium aluminum hydride (1.3 g., 0.035 mole) was added gradually to a stirred solution of 27.8 g. of 2,2-diphenyl-4-dimethylaminopentanenitrile in 200 ml. of anhydrous ether. The stirred suspension was then refluxed for six hours and allowed to stand at room temperature for about fifteen hours. Water (50 ml.) was then added gradually, and the mixture was filtered. The ether filtrate was washed with water and extracted with dilute hydrochloric acid. The hydrochloric acid extracts were made alkaline with concentrated ammonium hydroxide, and the liberated basic oil was extracted with ether, and the ether solution was washed with water and saturated sodium chloride solution. Concentration of this solution gave a residue of 25 g. of crude basic aldehyde as an oil. This was converted to the hydrochloride by dissolving it in a minimum amount of ether and adding anhydrous alcohol containing an excess of gaseous hydrogen chloride. The product crystallized upon standing and was filtered, recrystallized from a methanol-acetone mixture and air dried, giving 7 g. of the hydrochloride containing water of hydration and melting at 122–124° C. The anhydrous hydrochloride of 2,2-diphenyl-4-dimethylamino-1-pentanal was obtained by heating the hydrated hydrochloride in a vacuum oven at about 100° C. for about three days; it had the m. p. 187–189.5° C.

*Anal.*—Calcd. for $C_{19}H_{24}NOCl$: C, 71.81; H, 7.61; N, 4.40; Cl, 11.15. Found: C, 71.74; H, 7.37; N, 4.41; Cl, 10.93.

Example 2

2,2 - diphenyl - 3 - dimethylaminomethyl - 1 - butanol hydrochloride

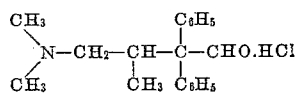

was prepared by a method analogous to that described in Example 1, starting with 1.3 g. of lithium aluminum hydride and 27.8 g. of 2,2-diphenyl - 3 - dimethylamino - methylbutanenitrile. The resulting oily basic aldehyde (25 g.) was converted to its hydrochloride, which was recrystallized from a methanol-acetone mixture and dried for three days in a vacuum oven at 100° C., giving 7.5 g. of 2,2-diphenyl-3-dimethylaminomethyl-1-butanol hydrochloride, M. P. 190–192° C.

*Anal.*—Calcd. for $C_{19}H_{24}NOCl$: C, 71.81; H, 7.61; N, 4.40. Found: C, 71.75; H, 7.34; N, 4.47.

Example 3

2,2-diphenyl-4-dimethylamino-1-pentanol hydrochloride, was prepared according to the method of Example 1 but on a larger scale, starting with 6.5 g. (0.175 mole) of lithium aluminum hydride and 139 g. (0.5 mole) of 2,2-diphenyl-4-dimethylaminopentanenitrile dissolved in 950 ml. of dry ether. The resulting 115 g. of crude oily basic aldehyde was converted to its hydrochloride, recrystallized from a methanol-acetone mixture, and dried in a vacuum oven at 100° C. for three days, giving 42 g. of the hydrochloride of 2,2-diphenyl-4-dimethylamino-1-pentanal, M. P. 183.5–186° C.

Example 4

Levo - 2,2 - diphenyl - 4 - dimethylamino - 1 - pentanal and its hydrochloride. Lithium aluminum hydride (3.55 g., 0.093 mole) was added portionwise to a stirred solution of 94 g. (0.34 mole) of dextro-2,2-diphenyl-4-dimethylaminopentanenitrile ($[\alpha]_D^{25} = +49°$ (1.5% in absolute ethanol), prepared as described by Larsen et al., J. Am. Chem. Soc. 70, 4194-7 (1948)) in 1.5 liters of absolute ether at 10° C. After the addition of the hydride was complete (about one-half hour), the mixture was allowed to stand at room temperature for about fifteen hours. The mixture was then treated with 35 ml. of water and 40 g. of solid sodium chloride, stirred for a few minutes, and the solid material was filtered off and washed with ether. The combined ether filtrates and washings were washed with water and extracted with dilute hydrochloric acid. The hydrochloric acid extracts were made alkaline with 35% sodium hydroxide solution, the liberated basic oil was extracted with ether, and the ether solution was washed with water and dried over anhydrous calcium sulfate. The drying agent was removed by filtration, and gaseous hydrogen chloride was passed into the ether solution. The resulting gummy solid was crystallized from acetone to give 24 g. of product which, when recrystallized from a mixture of acetone and methanol, gave levo-2,2-diphenyl-4-dimethylamino-1-pentanal hydrochloride in a hydrated form melting at 111–112° C. After drying at 100° C. in a vacuum oven for three days the product melted at 198–201° C., $[\alpha]_D^{25} = -28°$ (1% solution in water).

*Anal.*—Calcd. for $C_{19}H_{24}NOCl$: N, 4.40; Cl, 11.15. Found: N, 4.29; Cl, 10.92.

Levo - 2,2 - diphenyl - 4 - dimethylamino - 1 - pentanal hydrochloride possesses high analgesic activity, about twice that of the racemic form of Example 1, and the toxicity of the levo-form is no greater than that of the racemic form.

If, instead of hydrogen chloride, there is added to the free base hydrogen bromide, sulfuric acid, methyl iodide, benzyl chloride or methylbenzenesulfonate, one obtains respectively levo-2,2-diphenyl-4-dimethylamino-1-pentanal hydrobromide; levo-2,2-diphenyl-4-dimethylamino-1-pentanal sulfate or bisulfate; levo-2,2-diphenyl-4-dimethylamino-1-pentanal methiodide; levo-2,2-diphenyl - 4 - dimethylamino - 1 - pentanal benzochloride; or levo-2,2-diphenyl-4-dimethylamino-1-pentanal methobenzenesulfonate.

*Example 5*

Dextro - 2,2 - diphenyl - 4 - dimethylamino - 1-pentanal and its hydrochloride. Lithium aluminum hydride (3.97 g.) was caused to react with 105.4 g. of levo-2,2-diphenyl-4-dimethylaminopentanenitrile $[\alpha]_D^{25}=-49°$ (1.5% in absolute ethanol), prepared as described by Larsen et al., J. Am. Chem. Soc. 70, 4194–7 (1948)) by the method described in Example 4. There was thus obtained 16.0 g. of dextro-2,2-diphenyl-4-dimethylamino-1-pentanal hydrochloride in a hydrated form melting at 111–112° C., which after drying for about thirty-two hours in a vacuum oven at 70° melted at 201–203° C., $$[\alpha]_D^{24}=+28.8°$$

(1% solution in water).

*Anal.*—Calcd. for $C_{19}H_{24}NOCl$: N, 4.40; Cl, 11.15. Found: N, 4.45; Cl, 11.13.

*Example 6*

Levo - 2,2 - diphenyl - 3 - dimethylamino - methyl-1-butanal and its hydrochloride. Lithium aluminum hydride (1.97 g.) was caused to react with 52 g. of dextro-2,2-diphenyl-3-dimethylaminomethylbutanenitrile ($[\alpha]_D^{25}=+70°$ (1.5% in absolute ethanol), prepared as described by Larsen et al., J. Am. Chem. Soc. 70, 4194–7 (1948)) by the method described in Example 4. There was thus obtained levo-2,2-diphenyl-3-dimethylaminomethyl - 1 - butanal hydrochloride, M. P. 188–191° C. with sintering at 184° C., $[\alpha]_D^{24}=-149.2°$ (1% solution in water).

*Anal.*—Calcd. for $C_{19}H_{24}NOCl$: N, 4.40; Cl, 11.15. Found: N, 4.55; Cl, 10.83.

*Example 7*

Lithium aluminum hydride (46 g., 1.2 moles) was added portionwise over a period of forty-five minutes to a stirred solution of 600 g. (2.2 moles) of dextro-2,2-diphenyl-4-dimethylaminopentanenitrile in 9 liters of dry ether (dried over calcium hydride) while maintaining the temperature at 10–15° C. The mixture was allowed to warm to room temperature over a period of four hours, and 250 cc. of water was carefully added followed by 400 g. of sodium chloride. After allowing the reaction mixture to stand overnight, the solid material (mostly alumina and sodium chloride) was removed by filtration. About 800 cc. of water and 240 cc. of concentrated hydrochloric acid were then added to the ether filtrate, and the mixture was stirred for fifteen minutes. The aqueous acid layer was separated, the ether layer extracted with dilute hydrochloric acid, and the combined aqueous acid solutions were washed with ether and made basic with concentrated amonium hydroxide. The basic product which separated was extracted with benzene, washed with water and dried over anhydrous calcium sulfate. The benzene solution was then concentrated, the residue was dissolved in 1600 cc. of isopropyl alcohol, 200 cc. of concentrated hydrochloric acid was added, and the solution was cooled overnight in a refrigerator after seeding with a crystal of levo-2,2-diphenyl-4-dimethylamino-1-pentanal hydrochloride. The product was collected by filtration, washed with acetone and dried, giving 600 g. of crystalline product, M. P. 109–112° C. The mother liquors were concentrated, the residue dissolved in 250 cc. of acetone, and the solution seeded and cooled in an ice bath to give an additional 82 g., M. P. 103–105° C. The total yield of levo-2,2-diphenyl-4-dimethylamino-1-pentanal hydrochloride in hydrated form thus obtained was 94% of the theoretical.

The aldehyde hydrochloride obtained as described above was further purified as follows: 1156 g. of aldehyde hydrochloride was dissolved in 5 liters of boiling isopropyl alcohol, and the solution was filtered and cooled to 5° C. The recrystallized product was collected by filtration and dried for about fifteen hours in a vacuum oven, giving 1145 g., M. P. 110–113° C. When the latter material was heated for twenty-four hours at 80° C. and atmospheric pressure, 1015 g. of levo-2,2-diphenyl-4-dimethylamino-1-pentanal hydrochloride in anhydrous form, M. P. 201–203° C., was obtained.

*Example 8*

Lithium aluminum hydride reacts with 2,2-diphenyl-4-diethylaminopentanenitrile to give, after hydrolysis, 2,2-diphenyl-4-diethylamino-1-pentanal.

The basic nitriles (II) used as starting materials were prepared by alkylation of diphenylacetonitrile with the appropriate dialkylaminoalkyl halide in the presence of sodium amide. The reaction may be represented as follows, where X is halogen:

RR'N—CHR''—CHR'''—X+
(C$_6$H$_5$)$_2$CHCN+NaNH$_2$→
II+NaX+NH$_3$

This application is a continuation-in-part of copending applications, Serial No. 161,262, filed May 20, 1950, and Serial No. 286,439, filed May 6, 1952, both of which are now abandoned.

I claim:

1. A member of the group consisting of a compound of the formula

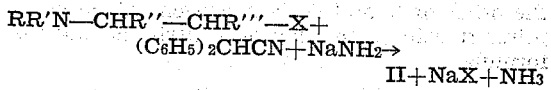

wherein R and R' are lower-alkyl groups, one of R'' and R''' is a methyl group and the other of R'' and R''' is hydrogen; and water-soluble, non-toxic salts thereof.

2. A compound of the formula

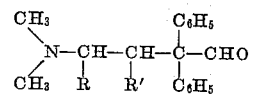

wherein one of R and R' is a methyl group and the other of R and R' is hydrogen.

3. 2,2 - diphenyl - 4 - dimethylamino - 1-pentanal having the formula

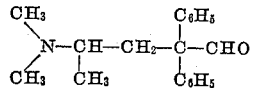

4. 2,2 - diphenyl - 3 - dimethylaminomethyl - 1 - butanal having the formula

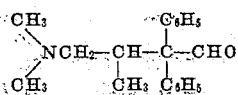

5. A water-soluble, non-toxic salt of 2,2-diphenyl-4-dimethylamino-1-pentanal.

6. Levo - 2,2 - diphenyl - 4 - dimethylamino-1-pentanal.

7. A water-soluble, non-toxic salt of levo-2,2-diphenyl-4-dimethylamino-1-pentanal.

8. 2,2 - diphenyl-4-dimethylamino-1-pentanal hydrochloride.

9. Levo - 2,2 - diphenyl - 4 - dimethylamino-1-pentanal hydrochloride.

10. The process for preparing a compound of the formula

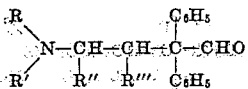

wherein R and R' are lower-alkyl groups, one of R'' and R''' is a methyl group and the other of R'' and R''' is hydrogen, which comprises treating a solution of a nitrile having the formula

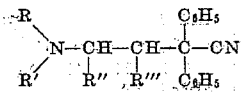

in an inert organic solvent with between about one-fourth and one-half of a mole of lithium aluminum hydride per mole of nitrile under substantially anhydrous conditions, and hydrolyzing the reaction mixture.

11. The process for preparing a compound of formula

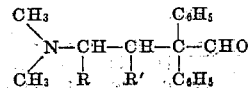

wherein one of R and R' is a methyl group and the other of R and R' is hydrogen, which comprises treating a solution of a nitrile having the formula

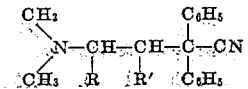

in an inert organic solvent with between about one-fourth and one-half of a mole of lithium aluminum hydride per mole of nitrile under substantially anhydrous conditions, and hydrolyzing the reaction mixture.

12. The process for preparing 2,2-diphenyl-4-dimethylamino-1-pentanal having the formula

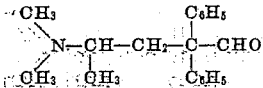

which comprises treating a solution of 2,2-diphenyl-4-dimethylaminopentanenitrile in an inert organic solvent with between about one-fourth and one-half of a mole of lithium aluminum hydride per mole of nitrile under substantially anhydrous conditions, and hydrolyzing the reaction mixture.

13. The process for preparing 2,2-diphenyl-3-dimethylaminomethyl - 1 - butanal having the formula

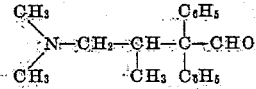

which comprises treating a solution of 2,2-diphenyl-3-dimethylaminobutanenitrile in an inert organic solvent with between about one-fourth and one-half of a mole of lithium aluminum hydride per mole of nitrile under substantially anhydrous conditions, and hydrolyzing the reaction mixture.

14. The process for preparing levo-2,2-diphenyl-4-dimethylamino-1-pentanal which comprises treating a solution of dextro-2,2-diphenyl-4-dimethylaminopentanenitrile in an inert organic solvent with between about one-fourth and one-half of a mole of lithium aluminum hydride per mole of nitrile under substantially anhydrous conditions, and hydrolyzing the reaction mixture.

References Cited in the file of this patent

Hochstein, J. A. C. S., vol. 71 (1949), pp. 305–7.
Thorp et al., "Nature," vol. 159 (1947), page 679.